(12) United States Patent
Stenberg

(10) Patent No.: US 12,290,845 B2
(45) Date of Patent: May 6, 2025

(54) GASEOUS FLUID EXTRACTOR APPARATUS

(71) Applicant: FUMEX AB, Skellefteå (SE)

(72) Inventor: Gustav Stenberg, Skellefteå (SE)

(73) Assignee: FUMEX AB, Skellefteå (SE)

( * ) Notice: Subject to any disclaimer, the term of this patent is extended or adjusted under 35 U.S.C. 154(b) by 524 days.

(21) Appl. No.: 17/598,880

(22) PCT Filed: Mar. 30, 2020

(86) PCT No.: PCT/SE2020/050321
§ 371 (c)(1),
(2) Date: Sep. 28, 2021

(87) PCT Pub. No.: WO2020/204789
PCT Pub. Date: Oct. 8, 2020

(65) Prior Publication Data
US 2022/0152673 A1 May 19, 2022

(30) Foreign Application Priority Data
Mar. 29, 2019 (CN) .................... 201920418257.7

(51) Int. Cl.
*B08B 15/04* (2006.01)
*F16L 27/02* (2006.01)

(52) U.S. Cl.
CPC ............ *B08B 15/04* (2013.01); *F16L 27/023* (2013.01)

(58) Field of Classification Search
CPC .... B08B 15/002; B08B 15/04; F16L 27/0861; F16L 27/0857
See application file for complete search history.

(56) References Cited

U.S. PATENT DOCUMENTS

| | | | |
|---|---|---|---|
| 3,818,817 A | 6/1974 | Nederman | |
| 4,158,462 A * | 6/1979 | Coral | H01R 35/02 |
| | | | 285/283 |
| 9,656,309 B2 | 5/2017 | Hedlund et al. | |
| 2007/0044268 A1 | 3/2007 | Cheng | |

FOREIGN PATENT DOCUMENTS

| CN | 205672694 U | 11/2016 |
|---|---|---|
| DE | 48222 C | 8/1889 |
| EP | 3117911 A1 | 1/2017 |
| SE | 7809477 L | 3/1980 |

(Continued)

OTHER PUBLICATIONS

European Search Report, European Application No. 20783913.5, dated Dec. 2, 2022.

(Continued)

*Primary Examiner* — Jorge A Pereiro
*Assistant Examiner* — Michael James Giordano
(74) *Attorney, Agent, or Firm* — MARSHALL, GERSTEIN & BORUN LLP

(57) ABSTRACT

An adjustable gaseous fluid extractor assembly including a first portion and a second portion. The assembly further includes a pivot mechanism providing that the first portion is pivotable relative the second portion about a respective first and second axis. The assembly further includes a flexible tubing element coupled to the first portion and to the second portion. The pivot mechanism is arranged exterior the flexible tubing element.

12 Claims, 4 Drawing Sheets

(56) References Cited

FOREIGN PATENT DOCUMENTS

SE          461574 B  *  3/1990  ............. B08B 15/04
WO   WO-2019/235990 A1   12/2019

OTHER PUBLICATIONS

European Office Action, European Application No. 20783913.5, dated Oct. 2, 2023.
International Search Report and Written Opinion for PCT/SE2020/050321, mailed Jun. 16, 2020.
International Preliminary Report on Patentability (Chapter II Demand) issued in PCT/SE2020/050321, mailed Jun. 14, 2021.
Examination Report, Indian Application No. 202147046791, dated Aug. 8, 2022.
Communication Pursuant to Article 94(3) EPC, European Patent Application No. 20783913.5, dated Jun. 6, 2024.

\* cited by examiner

GASEOUS FLUID EXTRACTOR APPARATUS

TECHNICAL FIELD

The present invention relates to an adjustable gaseous fluid extractor assembly comprising a first portion and a second portion, the adjustable gaseous fluid extractor assembly comprises a pivot mechanism providing that the first portion is pivotable relatively the second portion about a first and second axis. The pivot mechanism provides that e.g. a hood of the adjustable gaseous fluid extractor assembly the can be oriented in a proper way for optimal extraction of gases.

The present invention may concern the industry manufacturing ventilation arrangements designed for capturing gases and/or may especially concern the industry manufacturing adjustable gaseous fluid extractor assemblies.

The present invention may concern an adjustable gaseous fluid extractor assembly that is configured to be mounted to a wide range of extraction arms designed to capture e.g. welding fumes and dust at the source or work site. The captured gas may be smoke, welding fume, dusts, vapours or other gaseous fluid.

The present invention especially may concern the fume extractor manufacturing industry.

BACKGROUND

One type of current adjustable gaseous fluid extractor assemblies may have a hood that is pivotable about one axis. U.S. Pat. No. 3,818,817 discloses a linkable arm configured to carry an adjustable gaseous fluid extractor assembly, wherein lever means is arranged inside the tubing. The hood is configured to pivot in a single plane.

U.S. Pat. No. 9,656,309 B2 (to Fumex AB) discloses an adjustable fume extractor assembly comprising a first portion and a second portion coupled to a flexible tubing, wherein the assembly uses a pivot mechanism providing that the hood is pivotable about a first and second axis for smooth and freely adjustment of the hood in three dimensions.

The adjustable fume extractor assembly shown in U.S. Pat. No. 9,656,309 B2 works well, and is subject to research and development.

The adjustable fume extractor assembly is configured to be coupled to an extractor arm arrangement having significant length and flexibility.

It is of great importance to maintain the length and flexibility of the extractor arm arrangement without any reduction in flow of gaseous fluid in the flexible tubing and/or in the channel of the extractor arm arrangement.

SUMMARY OF THE INVENTION

There is an object to provide an adjustable gaseous fluid extractor assembly that is of low weight for easy handling in operation and providing an ergonomically correct worksite.

There is an object to provide a robust adjustable gaseous fluid extractor assembly configured for extraction of hot gases.

There is an object to achieve an adjustable gaseous fluid extractor assembly, which provides an efficient airflow of extracted gases.

There is an object to provide an adjustable gaseous fluid extractor assembly involving safety and comfort in positioning the hood.

There is an object to provide a pivot mechanism that is symmetrically arranged for simplified handling of the adjustable gaseous fluid extractor assembly.

There is an object to provide a pivot mechanism that is easy to adjust and uncomplicated access with adjustment tools, such as a wrench or fixed key.

There is an object to provide a simplified adjustable gaseous fluid extractor assembly.

There is an object to provide an energy saving adjustable gaseous fluid extractor assembly.

This or at least one of said objects has been solved by an adjustable gaseous fluid extractor assembly comprising a first portion and a second portion, the adjustable gaseous fluid extractor assembly comprises, a pivot mechanism providing that the first portion is pivotable relative the second portion about a respective first and second axis, a flexible tubing element coupled to the first portion and the second portion, wherein the pivot mechanism is arranged exterior the flexible tubing element.

By arranging the pivot mechanism exterior the flexible tubing element, the pivot mechanism will not be subject to e.g. hot gases extracted through the interior of the flexible tubing element.

In such a way, the pivot mechanism may be made of lightweight material, such as aluminium or composite matrix.

Alternatively, the flexible tubing element comprises a flexible material that provides that the flexible tubing element is bendable and stretchable.

Alternatively, the flexible tubing element may comprise polymer or steel.

Alternatively, the flexible tubing element comprises a first end and a second end.

Alternatively, the first end comprises a ring shaped member or a ring shaped fume inlet member.

Alternatively, the ring shaped member is made of stainless steel or other suitable material.

Alternatively, the adjustable gaseous fluid extractor assembly extends along a central longitudinal axis in a neutral state, defined as linearly oriented flexible tubing element.

Alternatively, the first axis is oriented perpendicular to the central longitudinal axis in said neutrals state.

Alternatively, the second axis is oriented perpendicular to the central longitudinal axis in said neutrals state.

Alternatively, the first and second axis being oriented perpendicular to each other.

Alternatively, the distance between the first and second portion corresponds with the distance between the first end and the second end of the flexible tubing element.

In such a way is achieved that the flexible tubing element can be bent according to any suitable direction of a plurality of possible three-dimensional directions, for optimal positioning and operation of the gaseous fluid extractor assembly at the same time as the interior of the flexible tubing element permits undisturbed flow of extracted gas.

In such a way is achieved that the flexible tubing element can be bent by three-dimensional pivot of the first portion relative the second portion.

Alternatively, the first portion is configured to be coupled to a hood member.

Alternatively, the second portion is configured to be coupled to a fume capture arm arrangement.

Alternatively, the rotatory mechanism is arranged between the first and second portion.

Alternatively, a major part of the rotatory mechanism is arranged between the first and second portion.

Alternatively, the rotatory mechanism is coupled between the first and second portion for providing a combined rotary motion about the first and second axis.

Alternatively, the first portion comprises the first axis about which the first portion is configured rotatable in a first sector.

Alternatively, the first sector exhibits a sector area of 0-180 degrees.

Alternatively, the second sector exhibits a sector area of 0-180 degrees.

Alternatively, the second portion comprises the second axis about which the first portion is configured rotatable in a second sector.

Alternatively, the first sector may constitute a sector angle of 10-120 degrees or 0-90 degrees.

Alternatively, the second sector may constitute a sector angle of 10-120 degrees or 0-90 degrees.

Alternatively, the first portion may be defined as a front portion of the adjustable gaseous fluid extractor assembly.

Alternatively, the second portion may be defined as a back portion of the adjustable gaseous fluid extractor assembly.

The front portion may be defined as a portion facing away from an extractor arm arrangement coupled to the adjustable gaseous fluid extractor assembly.

The back portion may be defined as a portion facing toward the extractor arm arrangement coupled to the adjustable gaseous fluid extractor assembly.

Alternatively, the front portion may comprising a first fastening means configured to couple a front end of the flexible tubing element to the adjustable gaseous fluid extractor assembly.

Alternatively, the front portion of the adjustable gaseous fluid extractor assembly is mounted to the front end of the flexible tubing element directly via the first portion.

Alternatively, the adjustable gaseous fluid extractor assembly is mounted to the front end of the flexible tubing element directly via a hood member.

Alternatively, the first portion comprises a ring shaped gaseous fluid inlet member.

Alternatively, the front end of the flexible tubing element is mounted to the ring shaped gaseous fluid inlet member.

Alternatively, the ring shaped gaseous fluid inlet member is made of stainless steel.

In such a way is achieved a robust adjustable gaseous fluid extractor assembly configured for extraction of e.g. hot gases, at the same time as it is made light-weight for easy handling in operation.

Alternatively, the ring shaped gaseous fluid inlet member is rigidly (for torsional stiffness) mounted to a first axis holding portion, e.g. by means of rivets.

Alternatively, the first axis holding portion comprises a first part and a second part.

Alternatively, the first part is mounted to the ring shaped gaseous fluid inlet member and the second part comprises a pivot joint member of the first axis.

Alternatively, the first axis holding portion comprises aluminium.

In such a way is achieved a lightweight first axis holding portion.

Alternatively, the first axis holding portion comprises a first and a second arm member extending in a direction from the ring shaped gaseous fluid inlet member toward the second portion.

Alternatively, the first and the second arm member are laterally arranged exterior the flexible tubing element.

Alternatively, a free end of the first arm member comprises a first pivot joint member.

Alternatively, a free end of the second arm member comprises a second pivot joint member.

Alternatively, the first and the second arm member are integral parts of a handgrip shaped bracket and are rigidly mounted to the ring shaped gaseous fluid inlet member.

Alternatively, the first axis is defined as a first imaginary axis that extends through the first and second pivot joint member.

Alternatively, the back portion may comprise a second fastening means configured to couple a back end of the flexible tubing element to the back portion of the adjustable gaseous fluid extractor assembly.

Alternatively, the back portion of the adjustable gaseous fluid extractor assembly is configured to be mounted to the flexible tubing element directly via the back portion.

Alternatively, the back portion of the adjustable gaseous fluid extractor assembly is configured to be mounted to the back end of the flexible tubing element via an outer end of the extractor arm arrangement.

Alternatively, the second portion comprises a second axis holding portion.

Alternatively, the second axis holding portion comprises a third and a fourth arm member extending in a direction toward the first portion and in direction from an outer end of an extractor arm arrangement being mounted to the flexible tubing element.

Alternatively, an interior channel of the flexible tubing element is configured to be coupled to an interior channel of the extractor arm arrangement for gaseous fluid communication, when mounted to each other.

Alternatively, the second axis holding portion comprises aluminium.

Alternatively, the third and the fourth arm member are laterally arranged exterior the flexible tubing element.

Alternatively, the respective third and fourth arm member being rigidly (for torsional stiffness) mounted to the outer end of the extractor arm arrangement.

Alternatively, a free end of the third arm member comprises a third pivot joint member.

Alternatively, a free end of the fourth arm member comprises a fourth pivot joint member.

Alternatively, the second axis is defined as a second imaginary axis that extends through the third and fourth pivot joint member.

Alternatively, a first link member is coupled between the first pivot joint member of the first arm member and the fourth pivot joint member of the fourth arm member.

Alternatively, a second link member is coupled between the second pivot joint member of the second arm member and the third pivot joint member of the third arm member.

Alternatively, the adjustable gaseous fluid extractor assembly extends along a central longitudinal imaginary axis in a neutral state, in which the adjustable gaseous fluid extractor assembly is linearly oriented.

Alternatively, the first imaginary axis is oriented perpendicular to the central longitudinal imaginary axis in said neutrals state.

Alternatively, the second imaginary axis is oriented perpendicular to the central longitudinal imaginary axis in said neutrals state.

Alternatively, the first imaginary axis is oriented perpendicular to the second imaginary axis in said neutrals state.

Alternatively, a first linkage member is coupled to the first pivot joint member and to the third pivot joint member.

Alternatively, a second linkage member is coupled to the second pivot joint member and to the fourth pivot joint member.

Alternatively, the first and second linkage member are arranged exterior the flexible tubing element.

Alternatively, the first and second linkage member comprises a lightweight material, such as aluminium or composite matrix.

Alternatively, the first linkage member comprises a linkage arm, a link bar, a connection rod or other pivoting connection member.

Alternatively, the second linkage member comprises a linkage arm, a link bar, a connection rod or other pivoting connection member.

Alternatively, the first and the second arm member being connected to the handgrip shaped bracket via a respective first and second outwardly protruding portion for distancing the handgrip shaped bracket from the pivoting first and second linkage member.

In such a way, the risk of pinching is reduced when an operator pivots the first portion relative the second portion by means of his hand.

Alternatively, the first pivot joint member comprises a screw and nut.

Alternatively, a respective screw serves as a pivot joint member at each pivot joint between each arm member and corresponding linkage member.

Alternatively, the first imaginary axis is positioned at a first distance from the front end of the flexible tubing element.

Alternatively, the first imaginary axis is positioned between the front end of the flexible tubing element and the second portion in said neutral state.

Alternatively, the second imaginary axis is positioned at a second distance from the outer end of the extractor arm arrangement.

Alternatively, the second imaginary axis is positioned between the outer end of the extractor arm arrangement and the first portion in said neutral state.

Alternatively, a linkage arrangement is configured to pivotally interlink the first portion with the second portion, which linkage arrangement is configured to form the first and second axis.

Alternatively, the respective first and second linkage member extends in circumferential direction exterior the envelope surface of the flexible tubing element.

Alternatively, in said neutral state, a first joining point of the first linkage member coupled to the first pivot joint member is positioned nearer the front end of the flexible tubing element than a third joining point coupled to the third pivot joint member.

Alternatively, in said neutral state, a second joining point of the second linkage member coupled to the second pivot joint member is positioned nearer the front end of the flexible tubing element than a fourth joining point coupled to the fourth pivot joint member.

Alternatively, in said neutral state, the first axis is positioned nearer the front end of the flexible tubing element than the second axis.

Alternatively, in said neutral state, the distance between the first axis and the second axis is determined from the diameter of the flexible tubing element in such a way that a large diameter involves a larger distance between the first and second axis than that being required by a flexible tubing element with a smaller diameter.

Alternatively, the first portion comprises a handle member.

In such a way, an operator or welder easily manages and operates the adjustable gaseous fluid extractor assembly in a proper way by means of the handgrip shaped bracket or handle member.

For example, the hood can thus be positioned correctly so that smoke and fumes from e.g. welding are captured leaving the welder hands free to work more efficiently.

BRIEF DESCRIPTION OF THE DRAWINGS

The present invention will now be described by way of examples with references to the accompanying schematic drawings, of which.

DETAILED DESCRIPTION

Hereinafter, exemplary embodiments of the present invention are described with reference to the accompanying figures, wherein for the sake of clarity and understanding of the invention some details of no importance may be deleted from the drawings. For example, in some drawings the flexible tubing is omitted.

Figure 1:
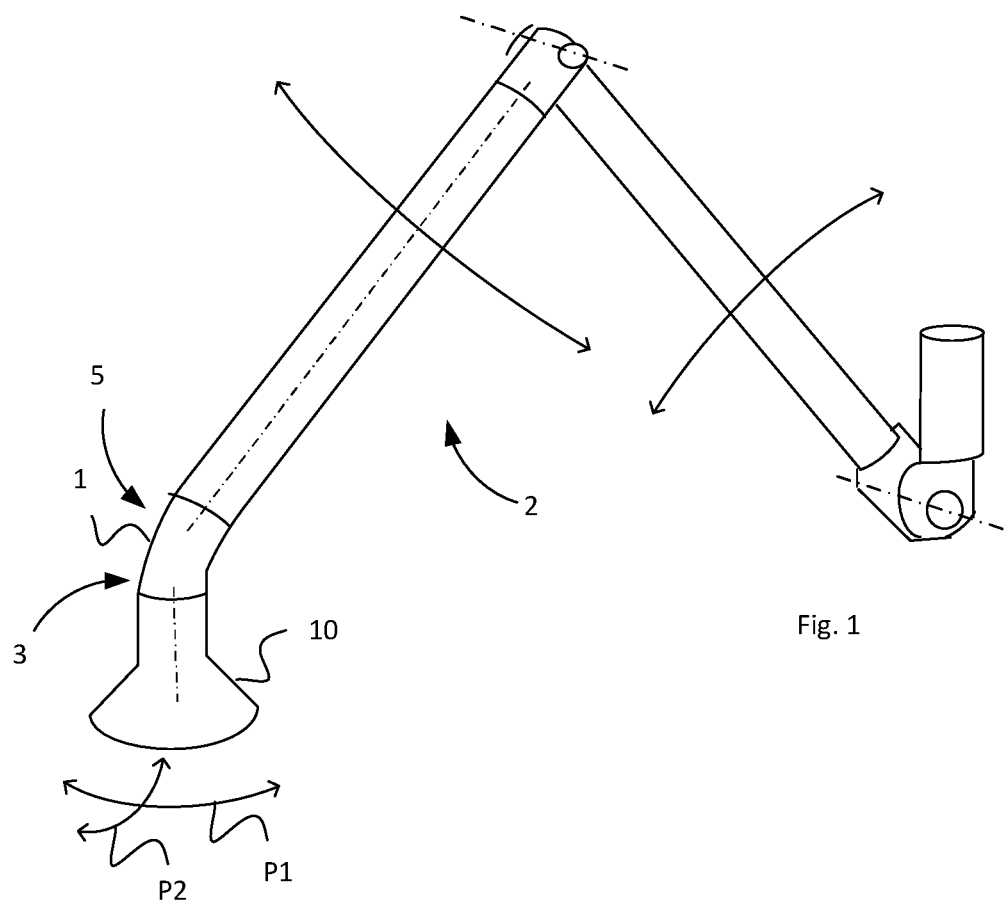
FIG. 1 illustrates an extractor arm arrangement comprising an adjustable gaseous fluid extractor assembly according to a first example.

FIG. 1 illustrates a hanging extractor arm arrangement 2 comprising an adjustable gaseous fluid extractor assembly 1 according to a first example. There may standing versions of extractor arm arrangements as well. The extractor arm arrangement is designed for source capturing different gases dust avoiding their expansion in a worksite.

A suction fan (not shown) is coupled to a channel of the extractor arm arrangement 2. A hood 10 is in turn mounted to the adjustable gaseous fluid extractor assembly 1. The adjustable gaseous fluid extractor assembly 1 comprises a pivot mechanism (not shown) providing that a first portion 3 of the adjustable gaseous fluid extractor assembly 1 is pivotable relatively a second portion 5 about a respective first and second imaginary axis (not shown) for freely pivoting the hood 10 in accordance with arrows P1 and P2, preferably in three-dimension.

Figure 2:
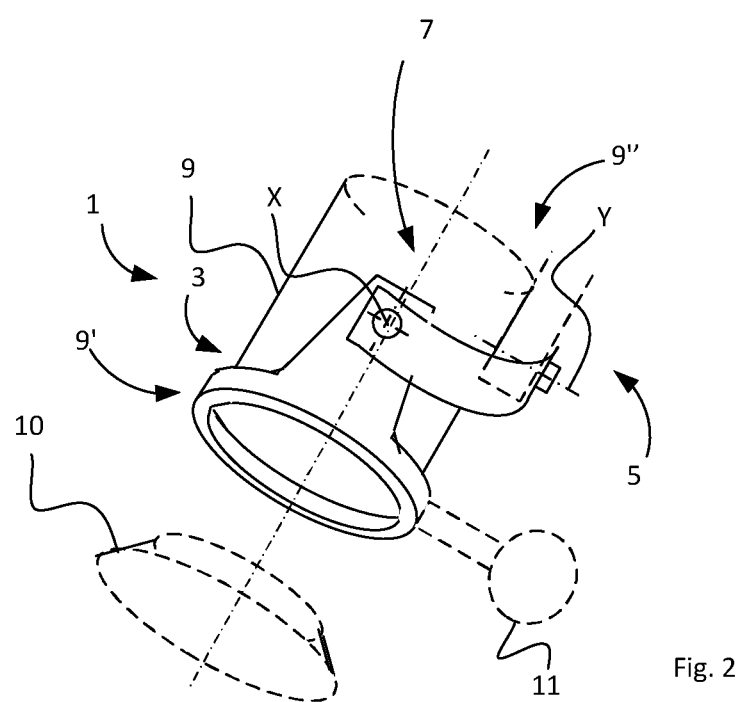
FIG. 2 illustrates an adjustable gaseous fluid extractor assembly according to a second example.

FIG. 2 illustrates an adjustable gaseous fluid extractor assembly 1 according to a second example. The adjustable gaseous fluid extractor assembly 1 comprises a first portion 3 and a second portion 5 and comprises a pivot mechanism 7. The pivot mechanism 7 is configured to provide that the first portion 3 is pivotable relative the second portion 5 about a respective first X and second Y axis. A flexible tubing 9 is coupled to the pivot mechanism 7 via a first end 9' and second end 9" of the flexible tubing 9. The flexible tubing 9 is configured to bend by means of the adjustable gaseous fluid extractor assembly 1 when an operator (not shown) moves a handle 11 coupled to the first portion 3. The pivot mechanism 7 is arranged exterior the flexible tubing 9. A hood 10 is configured to be coupled to the first end 9'.

Figure 3:
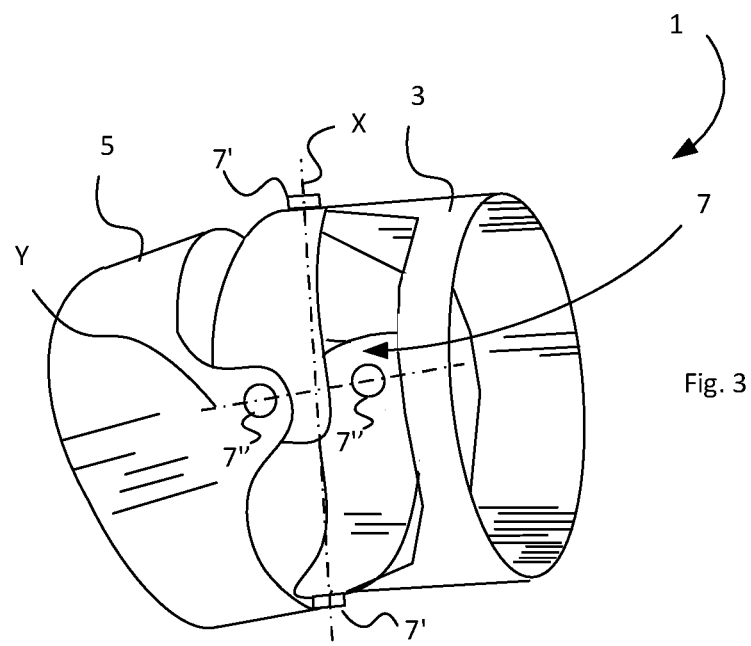
FIG. 3 illustrates an adjustable gaseous fluid extractor assembly according to a third example.

FIG. 3 illustrates an adjustable gaseous fluid extractor assembly 1 according to a third example. The adjustable gaseous fluid extractor assembly 1 comprises a first portion 3 and a second portion 5. The adjustable gaseous fluid extractor assembly 1 further comprises a pivot mechanism 7 providing that the first portion 3 is pivotable relative the second portion 5 about a respective first X and second Y imaginary axis. The first imaginary axis X is defined by means of and intersects a pair of first pivot joints 7'. The second imaginary axis X is defined by means of and intersects a pair of second pivot joints 7". A flexible tubing (not shown) is to be mounted to the adjustable gaseous fluid extractor assembly 1 and inside the pivot mechanism 7. The pivot mechanism 7 is arranged between the first 3 and second 5 portion. The first portion 3 comprises the pair of first pivot joints 7' about which the first portion 3 is configured to rotate. The second portion 5 comprises the pair of second pivot joints 7" about which the first portion 3 is configured to rotate.

Figure 4:
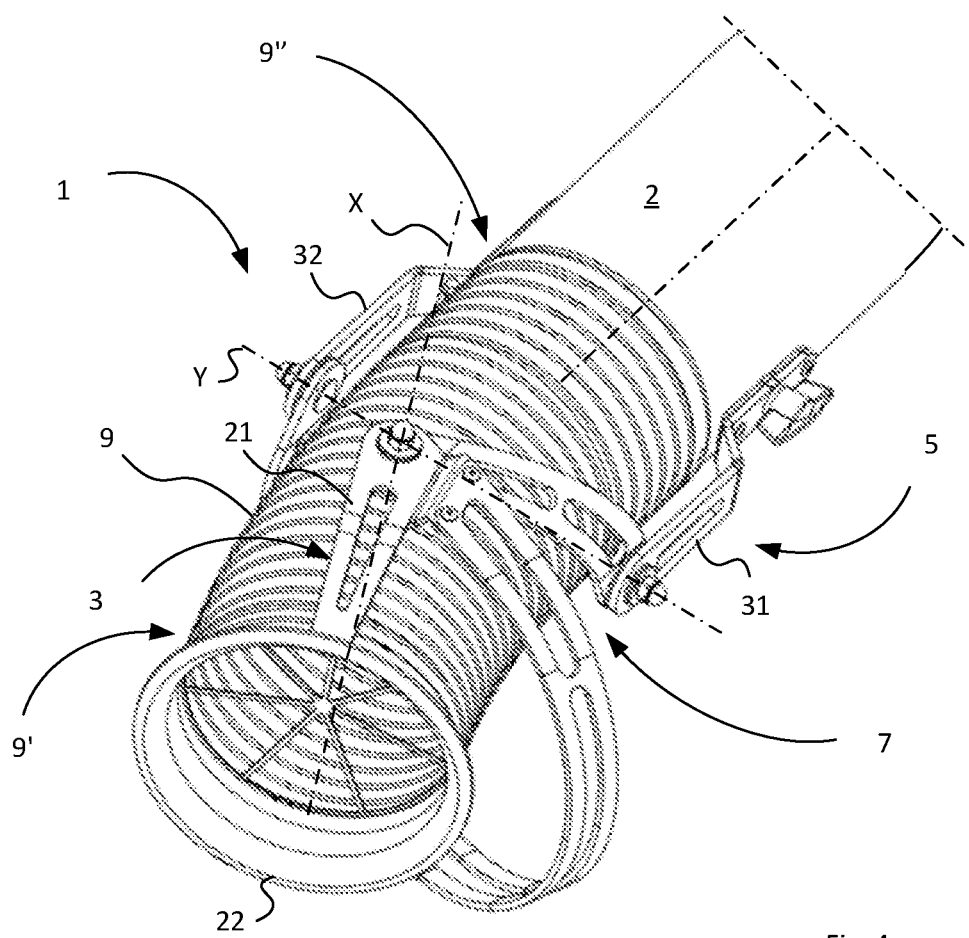
FIG. 4 illustrates an adjustable gaseous fluid extractor assembly according to a fourth example.

FIG. 4 illustrates an adjustable gaseous fluid extractor assembly 1 according to a fourth example. The adjustable gaseous fluid extractor assembly 1 comprises a first portion 3 and a back portion 5. The adjustable gaseous fluid extractor assembly 1 further comprises a pivot mechanism 7 providing that the first portion 3 is pivotable relative the back portion 5 about a respective first X and second Y imaginary axis.

A flexible tubing 9 is coupled to the pivot mechanism 7 via a front end 9' of the flexible tubing 9 that is coupled to the first portion 3. The first portion 3 comprises a first 21 and a second (not shown) arm being integrally mounted to a ring shaped inlet grill 22 of the first portion 3. A respective end part of each arm comprises pivot joints defining the first imaginary axis X, about which the first portion 3 is pivotable.

A back end 9" of the flexible tubing 9 is in turn configured to be coupled to a free end of the extractor arm arrangement 2. The back portion 5 of the adjustable gaseous fluid extractor assembly 1 is thus configured to be coupled to the flexible tubing 9 via the free end of the extractor arm arrangement 2 by means of a third 31 and a fourth 32 arm being mounted to the free end of the extractor arm arrangement 2. The third 31 and the fourth 32 arm extend in a direction toward the first portion 3 and in direction from the free end of the extractor arm arrangement 2. A respective end part of each arm 31, 32 comprises a respective pivot joint defining the second imaginary axis Y, about which the first portion 3 is pivotable.

Figure 5A:
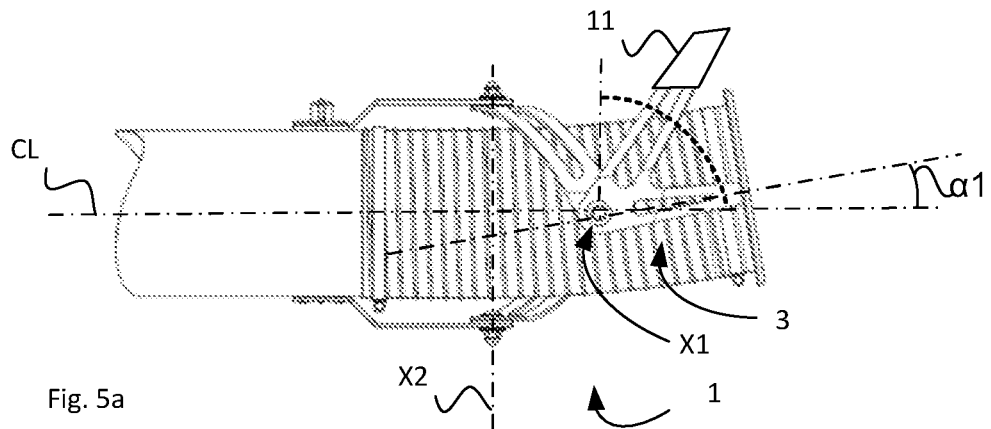
FIGS. 5a and 5b illustrate an adjustable gaseous fluid extractor assembly according to a fifth example.
Figure 5B:
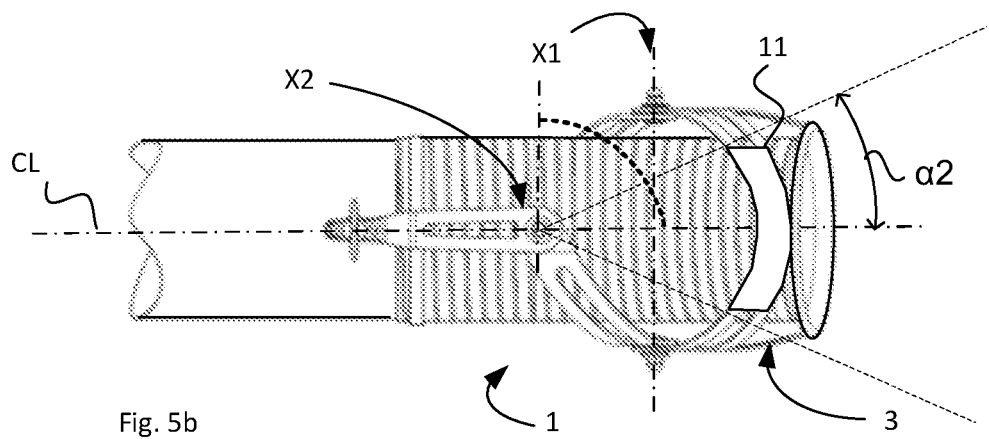

FIGS. 5a and 5b illustrate an adjustable gaseous fluid extractor assembly 1 according to a fifth example. FIG. 5a shows the adjustable gaseous fluid extractor assembly 1 in a side view. A bracket shaped handle 11 is arranged to the first portion 3.

The adjustable gaseous fluid extractor assembly 1 extends along a central longitudinal axis CL in a neutral state, in which state the flexible tubing is defined as a linearly oriented flexible tubing.

The first portion 3 is pivoted about a first axis X1 with an angle α1 of a first sector, the area of which may have an angle of 0-90 degrees, or preferably 15-60 degrees, from the central longitudinal axis CL.

Alternatively, the angle α1 of the first sector thus may exhibit a sector area of +/−90 degrees from the central longitudinal axis CL, thus the total rotary range of adjustable first portion 3 may be 0-180 degrees.

FIG. 5b shows the adjustable gaseous fluid extractor assembly 1 in a view from above. The bracket shaped handle 11 is not moved laterally, but adjusted to a straight orientation, wherein the adjustable gaseous fluid extractor assembly 1 extends along the central longitudinal axis CL.

However, the first portion 3 may be pivoted about a second axis X2 with a second angle α2 of a second sector, the area of which may have an angle of 0-90 degrees, or preferably 15-60 degrees, from the central longitudinal axis CL.

Alternatively, the second angle α2 of the second sector thus may exhibit a sector area of +/−90 degrees from the central longitudinal axis CL, thus the total rotary range of adjustable first portion 3 may be 0-180 degrees.

Figure 6:
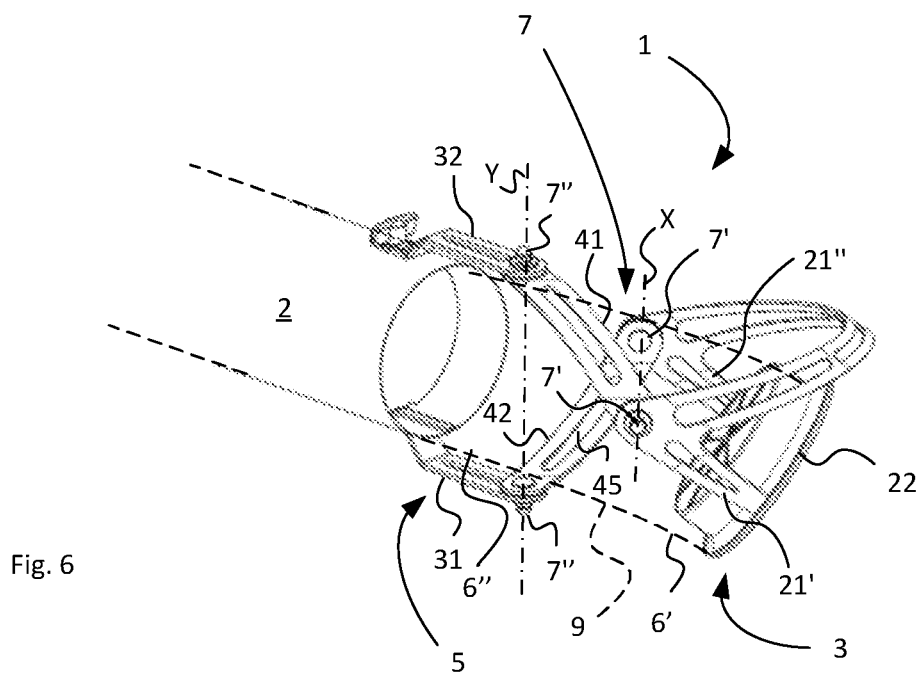
FIG. 6 illustrates an adjustable gaseous fluid extractor assembly according to a sixth example.

FIG. 6 illustrates an adjustable gaseous fluid extractor 1 according to a sixth example. The adjustable gaseous fluid extractor 1 comprises a first portion 3 and a second portion 5. The adjustable gaseous fluid extractor 1 comprises a pivot mechanism 7 providing that the first portion 3 is pivotable relative the second portion 5 about a respective first X and second X imaginary axis.

A front end 6' of the flexible tubing 9 is coupled to the first portion 3 of the adjustable gaseous fluid extractor 1. A back end 6" of the flexible tubing 9 is coupled to the second portion 5.

The first portion 3 comprises a ring shaped inlet grill 22, onto which the front end 6' of the flexible tubing 9 is attached.

The first portion 3 further comprises a first arm 21' and a second arm 21", each having a respective first pivot joint 7' about which the first portion 3 is configured to rotate.

The second portion 5 comprises a third 31 and a fourth 32 arm, each having a respective second pivot joint 7" about which the first portion 3 is configured to rotate.

The respective third 31 and fourth 32 arm being mounted to the extractor arm 2.

A first link 41 is coupled between the first pivot joint 7' of the first arm 21' and the second pivot joint 7" of the fourth arm 32.

A second link 42 is coupled between the first pivot joint 7' of the second arm 21" and the second pivot joint 7" of the third arm 32.

The first imaginary axis X is positioned nearer the front end 6' of the flexible tubing 9, comprising the ring shaped inlet grill 22, than the second imaginary axis Y.

The arms and links may be made of aluminium and may comprise lightening holes 45.

The pivot mechanism 7 is arranged exterior the flexible tubing 9 and is arranged between the first 3 and second 5 portion.

Figure 7A:
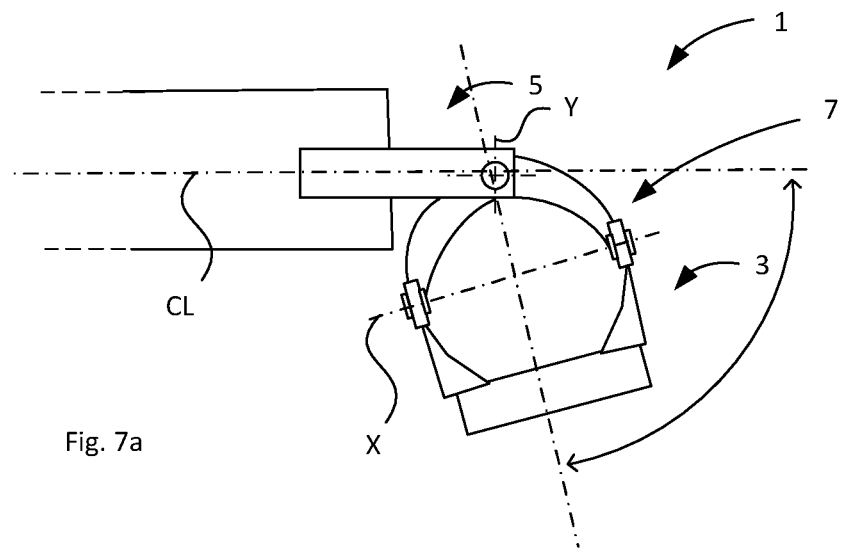
FIGS. 7a and 7b illustrate an adjustable gaseous fluid extractor assembly according to a seventh example.
Figure 7B:
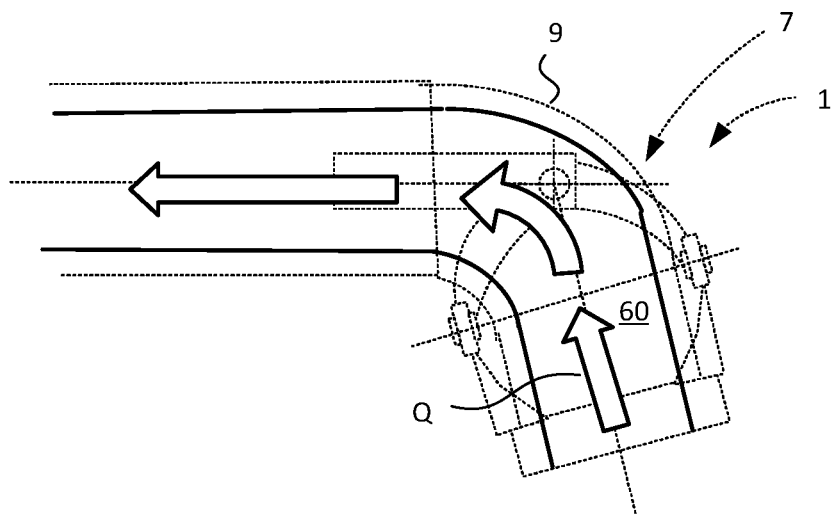

FIGS. 7a and 7b illustrate an adjustable gaseous fluid extractor 1 according to a seventh example. FIG. 7a shows (a flexible tubing is not shown) the adjustable gaseous fluid extractor 1 comprising a first portion 3 and a second portion 5. The adjustable gaseous fluid extractor 1 comprises a pivot mechanism 7 providing that the first portion 3 is pivotable relative the second portion 5 about a respective first X and second X imaginary axis.

The first portion 3 may be pivoted about the second axis Y with an angle α of a second sector, the area sector of which may exhibits an angle of 80 degrees from the central longitudinal axis CL.

FIG. 7b shows an interior channel 60 of the adjustable gaseous fluid extractor 1 shown in FIG. 1a.

By positioning the pivot mechanism 7 exterior the flexible tubing 9, the flow Q of gaseous fluid is achieved not affected by any disturbances in the channel 60, and freely pass through the interior channel 60, in an energy efficient way.

Furthermore, by positioning the pivot mechanism 7 exterior the flexible tubing 9, the pivot mechanism 7 would not be subjected to hot gases flowing through the channel 60, whereby the pivot mechanism 7 can be made of aluminium or other light material, which in turn provides for a light adjustable gaseous fluid extractor 1.

The present invention is of course not in any way restricted to the preferred examples described above, but many possibilities to modifications, or combinations of the described examples thereof, should be apparent to a person with ordinary skill in the art without departing from the basic idea of the invention as defined in the appended claims.

The invention claimed is:

1. An adjustable gaseous fluid extractor assembly, comprising:
    a first portion;
    a second portion;
    a pivot mechanism providing that the first portion is pivotable relative to the second portion about respective first and second axes, the pivot mechanism comprising a first pivot joint defining the first axis, a second pivot joint defining the second axis, and a link that extends between the first pivot joint and the second pivot joint, the link having a first end connected to the first pivot joint and a second end that is opposite the first end and is connected to the second pivot joint,
    wherein the first and second axes are oriented perpendicular to each other;
    a flexible tubing element coupled to the first portion and second portion; and
    wherein the pivot mechanism is arranged exterior the flexible tubing element,
    wherein in a neutral state, the adjustable gaseous fluid extractor assembly extends along a central longitudinal axis, such that the flexible tubing element is entirely linear and the first and second axes are oriented perpendicular to the central longitudinal axis, wherein, in said neutral state, the first axis is positioned nearer a front end of the flexible tubing element than the second axis, and wherein the pivot mechanism is symmetrically arranged for simplified handling of the adjustable gaseous fluid extractor assembly, wherein the first pivot joint comprises a pair of first pivot joints about which the first portion is rotatable, the first portion comprising a first arm having one of the pair of first pivot joints and a second arm having the other of the pair of the first pivot joints, and the second pivot joint comprises a pair of second pivot joints about which the first portion is rotatable, the second portion comprising a third arm having one of the pair of second pivot joints and a fourth arm having the other of the pair of second pivot joints, and wherein the link comprises a first link and a second link, the first link coupled between the first pivot joint of the first arm and the second pivot joint of the fourth arm, and the second link coupled between the first pivot joint of the second arm and the second pivot joint of the third arm.

2. The assembly according to claim 1, wherein the pivot mechanism is arranged between the first and second portion.

3. The assembly according to claim 1, wherein the first portion comprises the first axis about which the first portion is rotatable in a first sector exhibiting a sector area of 0-180 degrees.

4. The assembly according to claim 3, wherein the second portion comprises the second axis about which the first portion is rotatable in a second sector exhibiting a sector area of 0-180 degrees.

5. The assembly according to claim 1, wherein the second portion comprises the second axis about which the first portion is rotatable in a second sector exhibiting a sector area of 0-180 degrees.

6. The assembly according to claim 1, wherein the first portion comprises a handle member.

7. The assembly according to claim 1, wherein the link is arranged exterior to the flexible tubing element.

8. An adjustable gaseous fluid extractor assembly, comprising:
    a first portion;
    a second portion;
    a pivot mechanism providing that the first portion is pivotable relative to the second portion about respective first and second axes, the pivot mechanism comprising a link that extends between and directly connects the first portion and the second portion, wherein the link extends along an axis that is angled relative to the first and second axes,
    wherein the first and second axes are oriented perpendicular to each other;
    a flexible tubing element coupled to the first portion and second portion; and
    wherein the pivot mechanism is arranged exterior the flexible tubing element,
    wherein in a neutral state, the adjustable gaseous fluid extractor assembly extends along a central longitudinal axis, such that the flexible tubing element is linearly oriented, and the first and second axes are oriented perpendicular to the central longitudinal axis, wherein, in said neutral state, the first axis is positioned nearer a front end of the flexible tubing element than the second axis, and wherein the pivot mechanism is symmetrically arranged about the central longitudinal axis for simplified handling of the adjustable gaseous fluid extractor assembly, wherein the first portion comprises a first arm and a second arm each having a respective first pivot joint about which the first portion is rotatable, wherein the second portion comprises a third arm and a fourth arm each having a respective second pivot joint about which the first portion is rotatable, and wherein the pivot mechanism comprises a first link and a second link, the first link coupled between the first pivot joint of the first arm and the second pivot joint of the fourth arm, and the second link coupled between the first pivot joint of the second arm and the second pivot joint of the third arm.

9. The assembly according to claim 8, wherein the pivot mechanism is arranged between the first and second portion.

10. The assembly according to claim 8, wherein the first portion comprises the first axis about which the first portion is rotatable in a first sector exhibiting a sector area of 0-180 degrees.

11. The assembly according to claim 8, wherein the second portion comprises the second axis about which the first portion is rotatable in a second sector exhibiting a sector area of 0-180 degrees.

12. The assembly according to claim 8, wherein the link is arranged exterior to the flexible tubing element.

* * * * *